(12) United States Patent
Madej et al.

(10) Patent No.: US 6,938,824 B2
(45) Date of Patent: Sep. 6, 2005

(54) DECODING ALGORITHM FOR LASER SCANNING BAR CODE READERS

(75) Inventors: Dariusz J. Madej, Shoreham, NY (US); Joseph Boriotti, East Northport, NY (US); David P. Goren, Smithtown, NY (US); Vladimir Gurevich, Stony Brook, NY (US); David Tsi Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 626 days.

(21) Appl. No.: 10/095,865

(22) Filed: Mar. 13, 2002

(65) Prior Publication Data

US 2003/0066891 A1 Apr. 10, 2003

Related U.S. Application Data (60) Provisional application No. 60/324,893, filed on Sep. 26, 2001.

(51) Int. Cl.[7] .................................................. G06K 7/10
(52) U.S. Cl. .............................. 235/462.16; 235/462.1; 235/462.25
(58) Field of Search ........................ 235/462.16, 462.19, 235/462.17, 462.18, 462.1, 462.25, 462.26, 462.27, 462.28, 462.29; 2335/462.29

(56) References Cited

U.S. PATENT DOCUMENTS

| | | | | |
|---|---|---|---|---|
| 6,193,158 B1 | * | 2/2001 | Hecht et al. | 235/462.16 |
| 6,328,213 B1 | * | 12/2001 | He et al. | 235/462.25 |
| 6,382,511 B1 | * | 5/2002 | Tang et al. | 235/462.25 |

OTHER PUBLICATIONS

"Adaptive Wiener Denoising Using a Gaussian Scale Mixture Model in the Wavelet Domain" published in Proceedings of the 8th International Conference on Image Processing, Thessaloniki, Greece, Oct. 7–10, 2001.

* cited by examiner

Primary Examiner—Karl D. Frech
(74) Attorney, Agent, or Firm—Kirschstein, et al.

(57) ABSTRACT

A method for use in processing an analog signal from a laser scanning bar code reader containing information representative of reflected light from indicia including regions of different light reflectivity, and including narrow and wide elements of the same reflectivity of the indicia, by locating edge transitions between narrow and wide elements; estimating the edge shift associated with such transitions; and changing the edge position to correct for convolution distortion.

10 Claims, 6 Drawing Sheets

DECODING ALGORITHM FOR LASER SCANNING BAR CODE READERS

REFERENCE TO RELATED APPLICATIONS

This application is related to U.S. application Ser. No. 09/981,395, filed Oct. 16, 2001.

This application is also related to U.S. application Ser. No. 09/568,342 filed May 10, 2000.

This application claims the benefit of U.S. Provisional Application Ser. No. 60/324,893, filed Sep. 26, 2001.

BACKGROUND OF THE INVENTION

1. Field of the Invention

The invention relates to optical scanners for bar code reading, and in particular to the decoding algorithm used in a laser scanning bar code reader for processing blur or reducing the noise in reflected light signals.

2. Description of the Related Art

Bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies are in widespread use including UPC/EAN, Code 39, Code 128, Codeabar, and Interleaved 2 of 5.

In order to increase the amount of data that can be represented or stored on a given amount of surface area, several more compact bar code symbologies have been developed. One of these code standards, Code 49, exemplifies a "two dimensional" symbol by reducing the vertical height of a one-dimensional symbol, and then stacking distinct rows of such one dimensional symbols, so that information is encoded both vertically as well as horizontally. That is, in Code 49, there are several rows of bar and space patterns, instead of only one row as in a "one dimensional" symbol. The structure of Code 49 is described in U.S. Pat. No. 4,794,239. Another two-dimensional symbology, known as "PDF417", is described in U.S. Pat. No. 5,304,786.

Still other symbologies have been developed in which the symbol is comprised not of stacked rows, but a matrix array made up of hexagonal, square, polygonal and/or other geometric shapes, lines, or dots. Such symbols are described in, for example, U.S. Pat. Nos. 5,2276,315 and 4,794,239. Such matrix code symbologies may include Vericode, Datacode, and MAXICODE.

Various optical scanning systems and readers have been developed heretofore for reading indicia such as bar code symbols appearing on a label or on the surface of an article. The bar code symbol itself is a coded pattern of graphic indicia comprised of a series of bars of various widths spaced apart from one another to bound spaces of various widths, the bars and spaces having different light reflecting characteristics. The readers function by electro-optically transforming the spatial pattern represented by the graphic indicia into a time-varying electrical signal, which is in turn decoded into data which represent the information or characters encoded in the indicia that are intended to be descriptive of the article or some characteristic thereof. Such data is typically represented in digital form and utilized as an input to a data processing system for applications in point-of-sale processing, inventory control distribution, transportation and logistics, and the like. Scanning systems and readers of this general type have been disclosed for example, in U.S. Pat. Nos. 4,251,798; 4,369,361; 4,387,297; 4,409,470; 4,760,248; 4,896,026; 5,015,833; 5,262,627; 5,504,316; and 5,625,483, all of which have been assigned to the same assignee as the instant application and each of which are hereby incorporated by reference. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a semiconductor laser. The use of semiconductor devices as the light source is especially desirable because of their small size, low cost and low voltage requirements. The laser beam is optically modified, typically by an optical assembly, to form a beam spot of a certain size at the target distance. It is often preferred that the cross section of the beam spot measured in the scanning direction at the target distance be approximately the same as the minimum width in the scanning direction between regions of different light reflectivity, i.e., the bars and spaces of the symbol. Although typical readers utilize a single laser source, other bar code readers have been proposed with two or more light sources of different characteristics, e.g. different frequencies.

Typically, the semiconductor lasers used in such bar code scanner is an edge-emitting injection laser in which the laser beam in emitted from the p-n junction region on a polished end face of the device. By their physical nature, these known edge-emitting injection lasers emit a beam from a thin region at the p-n junction. A laser beam emanating from a thin source has a large beam divergence which makes focusing difficult and results in a wide rang of variability in performance from laser to laser.

A more recently developed from of semiconductor laser is the vertical-cavity surface-emitting laser diode (VCSEL), such as described in "Efficient Room-Temperature Continuous-Wave AlGaInP/Al GaAs Visible (670 nm) Vertical-Cavity Surface Emitting Laser Diodes" by R P Schneider et al. published IEEE Photonics Technology Letters, Vol. 6, No. 3, Mar. 1994. Reference is also made to U.S. Pat. Nos. 5,283,447; 5,285,455; 5,266,794; 5,319,496; and 5,326,386, which are hereby incorporated by reference, for background information.

The VCSEL has substantial surface area from which the laser beam is emitted; this are may be patterned. Thus, the beam produced is less divergent in one dimension than with know edge-emitting type semiconductor laser diodes. The output beam is round, and is virtually not astigmatic. Furthermore, VCSELs typically operate at significantly lower current than edge-emitting laser diodes. Therefore, it also generates less heat.

In the laser beam scanning systems known in the art, a single laser light beam is directed by a lens or other optical components along the light path toward a target that includes a bar code symbol on the surface. The moving-beam scanner operates by repetitively scanning the light beam in a line or series of lines across the symbol by means of motion or a scanning component, such as the light source itself or a mirror disposed in the path of the light beam. The scanning component may either sweep the beam spot across the symbol and trace a scan line across the pattern of the symbol, or scan the field of view of the scanner, or do both. The laser beam may be moved by optical or opto-mechanical means to produce a scanning light beam. Such action may be performed be either deflecting the beam (such as by a moving optical element, such as a mirror) or moving the light source itself. U.S. Pat. No. 5,486,944 describes a scanning module in which a mirror is mounted on a flex element for reciprocal oscillation by electromagnetic actuation. U.S. Pat. No. , 5,144,120 to Krichever et al., describes laser, optical and sensor components mounted on a drive for repetitive reciprocating motion either about an axis or in plane to effect scanning of the laser beam.

Another type of bar code scanner employs electronic means for causing the light beam to be deflected and thereby scan a bar code symbol, rather than using a mechanical motion to move or deflect the beam. For example, a linear array of closely spaced light sources activated one at a time in a regular sequence may be transmitted to the bar code symbol to simulate a scanned beam for a single source. Instead of a single linear array of light sources, a multiple-line array may also be employed, producing multiple scan lines. Such type of bar code reader is disclosed in U.S. Pat. No. 5,258,605 to Metlitsky et al.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol, detected, and converted into an electrical signal.

In retroreflective light collection, a single optical component e.g., a reciprocally oscillatory mirror, such as described in Krichever et al. U.S. Pat. No. 4,816,661 or Shepard et al. U.S. Pat. No. 4,409,470, both herein incorporated by reference, and Ser. No. 08/727,944, filed Oct. 9, 1996, scans the beam across a target surface and directs the collected light to a detector. The mirror surface usually is relatively large to receive as much incoming light as is possible, only a small detector is required since the mirror can focus the light onto a small detector surface, which increases signal-to-noise ratio.

Of course, small scan elements are preferable because of the reduced energy consumption and increased frequency response. When the scan element becomes sufficiently small, however, the area of the scanning mirror can no longer be used as the aperture for the received light. One solution is to use a staring detection system (a non-retroreflective system) which receives a light signal from the entire field which the scanned laser spot covers.

In non-retroreflective light collection, the reflected laser light is not collected by the same optical component used for scanning. Instead, the detector is independent of the scanning beam, and is typically constructed to have a large field of view so that the reflected laser light traces across the surface of the detector. Because the scanning optical component, such as a rotating mirror, need only handle the outgoing light beam, it can be made much smaller. On the other hand, the detector must be relatively large in order to receive the incoming light beam from all locations in the scanned field.

Electronic circuitry and software decode the electrical signal into a digital representation of the data represented by the symbol that has been scanned. For example, the analog electrical signal generated by the photodetector may be converted by a digitizer into a pulse width modulated digitized signal, with the widths corresponding to the physical widths of the bars and spaces. Alternatively, the analog electrical signal may be processed directly by a software decoder. See, for example, U.S. Pat. No. 5,504,318.

The decoding process of bar code reading systems usually works in the following way. The analog signal from the sensor or photodetector may initially be filtered and processed by circuitry and/or software to remove noise, adjust the dynamic range, or compensate for signal non-uniformities. Samples may then be taken of the analog signal, and applied to an analog-to-digital converter to convert the samples to digital data. See, for example, U.S. Pat. No. 6,170,749, which is herby incorporated by reference. Alternatively, analog circuitry may be used to digitize the shape of the signal. The digital samples or the pulse width modulated digitized signal is applied to a software algorithm, which attempts to decode the data in the signal to characters in the symbology. If the characters of the bar code symbol are all decoded successfully, the decoding process terminates and an indicator of a successful read (such as a green light and/or audible beep) is provided to the user. Otherwise, after a period of time, the decoder aborts operation of the decoding algorithm on the first scan data, receives the next scan, and performs another decode operation, and so on, until the scan data is decoded according to symbology specification into a binary representation of the data originally encoded in the symbol, and to the alphanumeric characters so represented.

The binary data representing the decoded characters is communicated to a host computer by an interface cable or wireless communication link. The interface cable may be a "smart cable" such as that described in U.S. Pat. Nos. 5,664,229 and 5,675,139, the contents of which are hereby incorporated by reference.

SUMMARY OF INVENTION

1. Objects of the Invention

It is a general object of the present invention to provide an improved decoder without the limitations of prior art readers.

It is another object of the invention to provide a laser scanning bar code reader with a decoder capable at decoding out of range or blurred symbols.

It is a further object of the present invention to provide a scanner for reading bar code symbols with a relatively large laser spot beam.

It is an even further object of the invention to provide a method which can be used to reducing speckle noise and accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

2. Features of the Invention

In keeping with these objects, and others which will become apparent hereinafter, one feature of this invention resides, briefly stated, in a method for use in an optical reader for reading indicia having parts of different light reflectivity, e.g. bar code symbols having alternating bars and spaces, by processing an analog signal representative of reflected light from the indicia by locating edge transitions between narrow and wide elements; estimating the edge shift associated with such transitions; and changing the edge position to correct for convolution distortion and/or speckle noise.

The invention further provides an optical code reader in which a laser spot is swept across a symbol including elements of different light reflecting, and the reflected light is detected by a sensor that generates an analog electrical signal indicative of the detected light intensity including light source having an emitted beam with a spot size on the target symbol in the working range having a diameter at least twice the smallest bars in the symbol; a differentiating circuit for processing the analog electrical signal into a first derivative of the analog signal; and a processor for classifying narrow and wide elements and correcting for convolution distortion and/or speckle noise.

The novel features and characteristics of the invention are set forth in the appended claims. The invention itself, however, as well as other features and advantages thereof, will be best understood by reference to a detailed description of a specific embodiment, when read in conjunction with the accompanying drawings.

DESCRIPTION OF THE PREFERRED EMBODIMENT

The invention relates to bar code readers of the type generally described in the above identified patents and patent applications for reading bar code symbols. As used in this specification and the claims, the term "bar code symbol" is intended to be broadly constructed and to cover no only symbol patterns composed of alternating bars and spaces, but also other graphic patterns, such as dot or matrix array patterns, and, in short, indicia having portions of different light reflectivity or surface characteristics that results in contrasting detected signal characteristics that can be used for encoding information and can be read and decoded with the type of apparatus disclosed herein.

Different bar codes have different information densities and contain a different number of elements in a given area representing different amounts of encoded data. The denser the code, the smaller the elements and spacings. Printing of the denser symbols on an appropriate medium exacting and thus is more expensive than printing symbols with larger elements. The density of a bar code symbol can be expressed in terms of the minimum bar/space width, also called "module size", or as a "spatial frequency" of the code, which is in the inverse of twice the bar/space width.

A bar code reader typically will have a specified resolution, often expressed by the module size that is detectable by its effective sensing spot. For optical scanner, for example, the beam spot size may be somewhat larger than the minimum width between regions of different light reflectivities, i.e., the bars and spaces of the symbol. The resolution of the reader is established by parameters of the beam source or the detector, by lenses or apertures associated with either the beam source or the detector, by the angle of beam inclination with respect to the plane of the symbol, by the threshold level of the digitizer, by the programming in the decoder, or by a combination of two or more of these elements. The photodetector will effectively average the light scattered from the area of the projected spot which reaches the detector aperture.

The region within which the bar code scanner is able to decode a bar code is called the effective working range of the scanner. Within this range, the spot size is such as to produce accurate reading of bar codes for a given bar code density. The working range is dependent on the focal characteristic of the scanner components and on the module size of the bar code.

Many known scanning systems collimate or focus the laser beam using a lens system to create a beam spot of a given diameter at a prescribed distance. The intensity of the laser beam at this point, in a plane normal to the beam (ideally approximately parallel to the scanned symbol), is ordinary characterized by a "Gaussian" distribution with a high central peak. Gaussian beams typically have a profile along their axis of propagation exhibiting a waist (collimated) zone with limited divergence followed by a divergence zone thereafter. The collimated zone determines a depth of field (focusing range) for maximum bar code density. The working range is defined as the region within which the scanned beam spot is sufficiently well formed that its detected scattered radiation can be decoded by the scanner. But as the distance between the scanner and the symbol moves out of the working range of the scanner, which is typically only a few inches in length, the Gaussian distribution of the beam spot greatly widens, preventing accurate reading of a bar code. Such scanning systems, according, must be positioned within a relatively narrow range of distances from a system in order to properly read the symbol.

It is known that in certain scanning applications, an elongated or elliptical spot may be used to improve the performance of the scanning system. See, for example, U.S. Pat. No. 5,648,649 to Bridgelall. When an elliptical spot is employed, ideally the major axis of the spot is oriented parallel to the major axes of the bars making up the target code and perpendicular to the direction of beam scan. Such a spot form may reduce inaccuracies in reading the code, since, for example, an elliptical spot system is somewhat less susceptible to errors introduced by voids and spreads in symbol and speckle noise.

More particularly, the invention relates to improving the working range of a bar code reader by providing an algorithm to decode reflected light signals acquired at distances or under conditions that cause distortion or blurring of the analog signal representing the actual sharp light dark transitions in an ideal printed symbol. Such blurring could result from bleeding of print ink, dirt or marks on the symbol, optical effects of color printing, wrinkled substrates or packaging, out-of-focus optics, undersampling, low pass filtering of the analog signal, or other optical or electrical signal processing causes. The invention thus relates to improving decoding accuracy in the presence of low and high frequency noise.

In the past, deblurring algorithms were deployed in laser scanning system as a means of increasing far reading range, and sometimes close reading range, if the close range was limited by convolution distortion.

The improved performance of the deblurring algorithms can be used in conjunction with laser beam refocusing to optimize various parameters of the laser scanning system including but not limited to, far and close reading ranges, angular decoding performance, and noise performance.

The blur performance of the algorithm is usually expressed in the frequency domain as the Modulation Transfer Function (MTF). It can also be expressed in the time domain as the maximum ratio of the laser spot size to the narrow element size the decoder can successfully handle. The invention provides a method to estimate the blur performance of a decoding algorithm in both time and frequency domain for a Gaussian beam.

Because deblurring algorithms can tolerate higher amounts of blur, the laser beam waist can be made larger, with no performance loss on high density codes. In the method of beam optimization, the maximum waist size of the laser beam is a function of the blur performance of the decoding algorithm, and the highest density of the bar code the scanner is designed to read.

Expanding the beam waist reduces the divergence of laser beam. The slower divergence property of a beam with larger waist diameter allows the scanner to decode at greater ranges. This concept also allows us to reposition the beam waist relative to the scanner, further improving decode performance.

The larger size of the beam waist and resulting slower beam divergence lead directly to increased far reading ranges. The range gain obtained by beam optimization for the deblurring algorithm exceeds substantially the gain obtained by using the deblurring algorithm without beam optimization.

For instance, combining a deblurring algorithm with an optimized Gaussian beam yields read ranges 2 to 4.5 times over conventional Gaussian beam scanning systems. If the beam profile is not optimized to take advantage of the deblurring algorithms the Imager deblurring algorithm yields only 1.5 to 2 times range gains.

Combining a laser deblurring algorithm with an optimized Gaussian beam extends read ranges 1.5 to 2 times over conventional Gaussian Beam scanning systems, while a laser deblurring algorithm without beam optimization extends ranges only 1.2 to 1.5 times.

Optimizing the laser beam for the deblurring decoder can increase the far reading range. When the extended far reading range is not needed but close reading range is desired, the close range can be improved by bringing the larger beam waist closer to the scanner. Then, the deblurring decoder compensates for the resulting reduction of far reading range.

In some applications, the laser beam is elliptical, that is, its size in the direction perpendicular to the scanning line (Y direction) is larger than the beam size in the direction of the scan line (X direction). Such a beam shape is useful for decoding poorly printed symbols. However, ellipticity negatively affects the angular decoding performance of the scanner, and is not desired in omni-directional and two-dimensional bar code scanners.

Since the deblurring algorithm allows for using a beam with a larger X-size, one can design a more symmetric beam with the Y-size as it would be in the elliptical beam and increased X-size. In this case, the combination of the beam optimization and deblurring algorithm improves the poor quality symbol performance without losing the advantages of a symmetric beam.

The level of speckle noise is inversely proportional to the area of the laser spot. Thus, a paper noise is largest at the waist of the beam, when the laser spot size is at its minimum. By using the deblurring algorithm and refocusing the beam in order to increase the waist size, the beam area will grow and the level of the paper noise will be reduced. For instance, the symmetric Gaussian beam optimized for the Deblurring Algorithm will have the area at its waist four times larger than the area of the beam optimized for the standard decoder.

When a far reading range increase is not needed, the combination of deblurring algorithm and beam optimization can be used to increase the noise immunity of the scanner and will improve the decoding of poorly printed symbols. With the beam refocused for the deblurring decoder, the signal modulation at the end of the working range will be greater than in case of regular scanner. The increased signal modulation can be used to improve the noise performance. A higher digitizer threshold can be used and/or the corner frequency of the noise filter can be lowered.

In order to optimize the beam for the blur performance of the decoder, the performance must be qualitatively evaluated. The blur performance can be expressed both in the spatial domain, as the maximum ratio of the laser spot size to the narrow element size the decoder can successfully handle, and in the frequency domain as the minimum MTF contrast of the fundamental frequency of the narrow element. Higher ratio values (or lower contrast) correspond to better blur performance. The practical method of performance evaluation in both domains is presented below.

The Method of the Estimation of the Blur Performance of a Decoding Algorithm

The method of the present invention quantifies the blur performance of a deblurring algorithm. The performance was characterized assuming that the laser beam has a Gaussian profile. The blur performance was expressed both in the spatial domain as the maximum ratio of the laser spot size to the narrow element size the decoder can successfully handle, and in the frequency domain as the minimum MTF contrast of the fundamental frequency of the narrow element.

The level of blur can be defined by the ratio of the laser beam size relative to the narrow element size. In the case of a Gaussian beam, the beam size equals approximately four times the standard deviation of a Gaussian function (sigma). Thus the blur performance of the decoding algorithm can be characterized by the ratio:

$$R = \frac{\sigma}{N}$$

Where $\sigma$ is a standard deviation of a Gaussian function, and N is the narrow element width. The higher the ratio, the better the algorithm deals with blur.

Assuming that the beam LSF is defined by:

$$h(x) = \frac{1}{\sqrt{2\pi\sigma^2}} e^{\frac{-x^2}{2\sigma^2}} \quad (1)$$

The MTF is the Fourier transform of (1) given by:

$$H(\omega) = e^{-\frac{\omega^2\sigma^2}{2}} \quad (2)$$

Since the highest frequency component of the bar code pattern equals to:

$$\omega_0 = 2\pi f_0 = \frac{2\pi}{2N}$$

and $$\sigma = \Re N$$

We obtain:

$$H(\omega_0) = e^{-\frac{\pi^2 R^2}{2}} \quad (3)$$

The contrast at $\omega_0$ is defined as:

$$C = \frac{H(\omega_0)}{H(0)}$$

Assuming H(0)=1, we get:

$$C = e^{-\frac{\pi^2 R^2}{2}} \quad (4)$$

Equation (4) defines the relationship between the Fourier domain MTF contrast level and the beam size to narrow element ratio.

The method was used to characterize the blur performance of the Imager Decoder Algorithm (ILA) described in U.S. Pat. No. 6,328,213, the Laser Deblurring Algorithm (LDA) described below.

In order to determine the blur performance, MATLAB simulations were carried on using the following bar code test symbols:

Code 39 symbol "123ABC", narrow-to-wide ratio of 1:2, 1:2.5, 1:3.
EAN-13 symbol "383889580358"
UPCA symbol "012345678901"

The signals were obtained by convolving a Gaussian function with a bar code pattern. The differentiated signal was calculated, as it would be in the reader using a 1 MHz sampling rate. That signal was then used as an input to the IMP based scanner simulator with a standard decoder. IMP settings were chosen as in current reader. The blur level was controlled by changing the standard deviation of the Gaussian function relative to the narrow element size. By applying the derivative signal to a standard decoder, we established the maximum blur magnitude the decoder can tolerate. The performance of the LDA was established the same way.

In order to evaluate the performance of IDA, the derivative signal was converted to a raw signal. Discrete integration and down-sampling were used. Sampling rates varied from 1 Mhz to 100 kHz.

The results are listed in Table 1. Higher ratio values (or lower contrast levels) correspond to better blur performance.

TABLE 1

Blur performance of Regular, Laser Deblurring and Imager Decoder

| Bar Code Type | W/N Ratio | Regular decoder ratio σ/N | Regular decoder contrast C | Laser Deblurring ratio σ/N | Laser Deblurring contrast C | Imager Deblurring Ratio σ/N | Imager Deblurring contrast C |
|---|---|---|---|---|---|---|---|
| Binary | 2X | 0.5 | 0.2912 | 0.8 | 0.0425 | 1.07 | 0.0035 |
| Binary | 2.5X | 0.66 | 0.1165 | 0.8 | 0.0425 | 1.19 | 0.0009 |
| Binary | 3X | 0.75 | 0.0623 | 0.8 | 0.0425 | 1.2 | 0.0008 |
| Delta | 2X | 0.6 | 0.1692 | 0.8 | 0.0425 | 0.88 | 0.0219 |

1. Discussion of Results

Regular decoder fails due to the edge shift caused by convolution distortion. The decoder looses the ability to distinguish some Narrow elements form some Wide elements. That happens when the ratio of the spot size to Narrow element size is 2.5, assuming Gaussian beam shape.

If that disturbance is removed, than the next limitation arise due to the drop of signal contrast (modulation) below the sensitivity of edge detector. If we set the edge detector to detect edges of 10% if maximum signal strength, the modulation will fall below that, when the ratio of the spot size to N reaches 3.5.

The ability to decode with higher ratio of spot size to Narrow element translates to extension of the working range.

The goal of described method is to reverse "edge shift". Thus, the working range would be limited by the low modulation depth, rather then by edge shift.

If the convolution distortion is studied more detail, one can find out that in order to cancel the "edge shift factor" it is enough to do that for edges located in between Narrow and Wide elements. However edges shift also in case of other edge configurations, the shift is small enough to be handled by standard decoder properly. For that reason, edges between Wide/Wide or between Narrow/Narrow are left intact.

Summarizing, in order to decode one must do the following:
  locate edges located in between Narrow and Wide elements,
  estimate edge shift (convolution distortion),
  change edge position (timing) to correct for the convolution distortion during DBP generation.

Additionally, in order to improve performance, noise reduction algorithm might be used before the de-blurring. The flow-chart of the de-blurring process in shown of FIG. 7.

2. Convolution Model

Turning now to FIG. 1, we assume that the laser beam has a Gaussian shape of width=4σ, where σ equals to standard deviation.

Figure 1A:
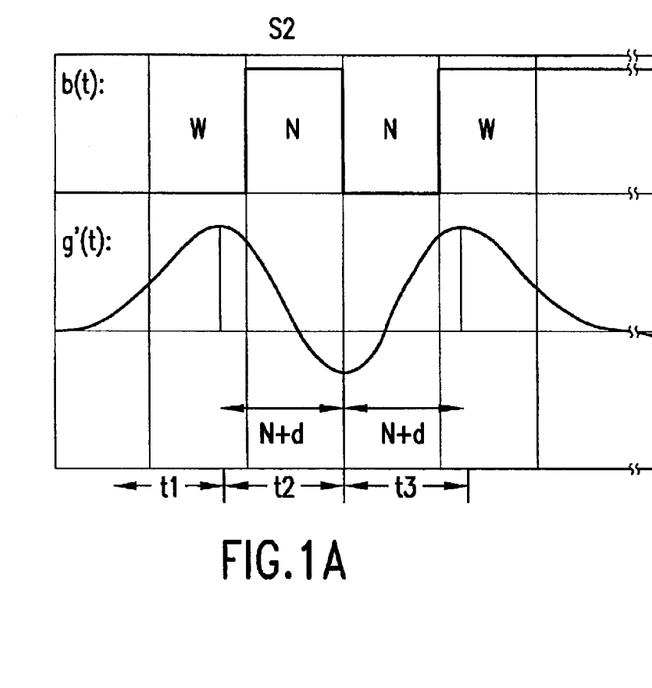
FIG. 1 is a highly simplified diagram of an ideal symbol waveform and the convolution signal.

A blurred sequence of two Narrow elements is shown in the left side of the Figure in portion FIG. 1A, in section (a). Observed width of narrow element is equal to Narrow element width (N) plus Convolution Distortion (d), we will call it Blurred-N. Note that location of the edge between Narrow-and-Narrow is not affected by blur.

Figure 1B:
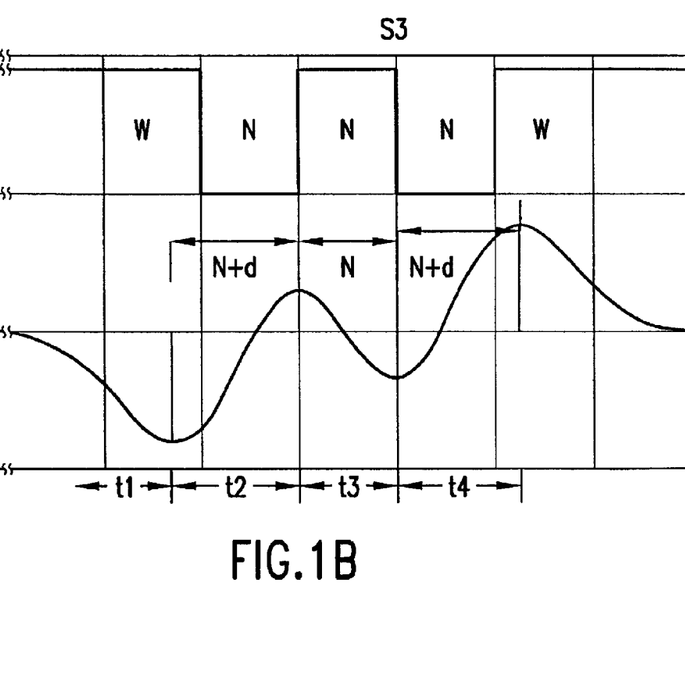

A blurred sequence of three Narrow elements is illustrated on the right side of the Figure in the FIG. 1B portion. In that case, the observed width of the first and the last element is N+d, while the width of the middle element is N (we will call those: Clear_N). If we took a sequence of 4 elements, the width of the first and last element would be N+d, while the width of the second and third element would be N and so on.

3. Signal Representation

The first derivative of the luminance of the reflected laser light from is used as the bar code representation. This signal is selectively sampled and represented in Multibit format yielded by Symbol proprietary circuit called IMP. The selective samples, rather then all samples of the derivative signal, are used in the de-blurring process described below. The Multibit concepts were previously described in:

Goren, *Multibit Digitizer*, U.S. Pat. No. 5,302,813, April 1994,

S. Shellhammer, D. Goren, T. Pavlidis, *Selective Sampling and Edge Enhancement in Bar Code Laser Scanning*, in proc. SPIE, 1996

S. Shellhammer, D. Goren, T. Pavlidis, *Novel Signal-Processing Techniques in Barcode Scanning*, IEEE Robotics and Automation Magazine, March 1999.

4. Noise Reduction Algorithm

The Multibit data, which represent a scan, contain elements, which origin from the bar code edges and also elements, which arise either from noise, or from the graphical elements located next to bar code. The noise reduction algorithm is used prior to de-blurring and is aimed to eliminate some Multi-bit data, which do not belong to the bar code. The benefit of that procedure is twofold. First, it reduces the amount of data in a scan, thus increasing the time-efficiency of the de-blurring process. Second, it increases the robustness of element classification described below, since noise or non-bar-code elements can be mistaken for bar code elements and thus cause the error in the de-blurring.

The noise reduction algorithm is based on following constrains. When the bar code is blurred then the width of a narrow element is limited to the values in a small range of numbers between N1 and N2. The values N1 and N2 do not depend on bar code density and the distance between the bar code and the scanner, but they depend on laser focusing, sampling rate, scan angle, and number of scans per second, thus they can be evaluated a priori.

The first edge of a bar code signal is a sharp transition from white to black. Also, the last edge is a sharp transition from black to white. It is also very likely that there must be at least three strong edges for every k bar code elements. The value of k deepens on the symbology, yet it is easy to pick the value, which is correct for most popular symbolgies used today.

The noise reduction algorithm utilizes those facts to eliminate the noise edges, which are located in a scan data before the first bar code element and after the last bar code element.

5. Element Classification and Blur Correction

The bar code elements are classified into three classes: Narrow, Wide, and Unknown. During that stage the width of a Narrow element and the edge shift error caused by blur is estimated as well. Elements of the smallest width N are considered the Narrows, while elements of the width equal to kN are the Wides. The value of k varies and depends on symbology. In case of binary code like Code 39, k is in the range between 2 and 3. In case of delta codes, like UPC or Code 128 this value belongs to the set of {2,3,4}, in case of PDF it is in the set of {2,3,4,5,6}, and in case of RSS in is an integer from 2 to 9. If the symbology allows for more than two element widths (delta symbology) the distinction between elements of the width 2N, 3N, 4N and so on, is not made during the de-blurring, since the standard decoders can adequately do such job after the de-blurring is completed. If the element can not be classified as either Narrow or Wide its class is assumed to be Unknown.

The process of element classification is done in several steps:

The sequences composed of at least two consecutive narrow elements are identified.

The width of a narrow element N and the edge shift error D is evaluated using identified sequences.

The remaining elements are classified.

The edges located between narrow and wide elements are identified, and the position of those edges is corrected by the value of D in order to reverse the distortion caused by blur.

6. Identification of Sequences of Narrow Elements

Figure 2:
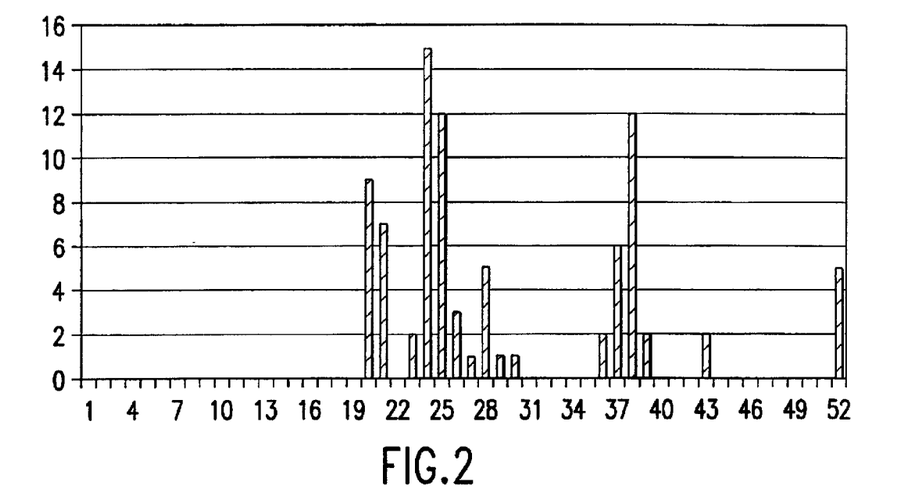
FIG. 2 is a timing histogram of a symbol at a reading distance of six inches.
Figure 3:
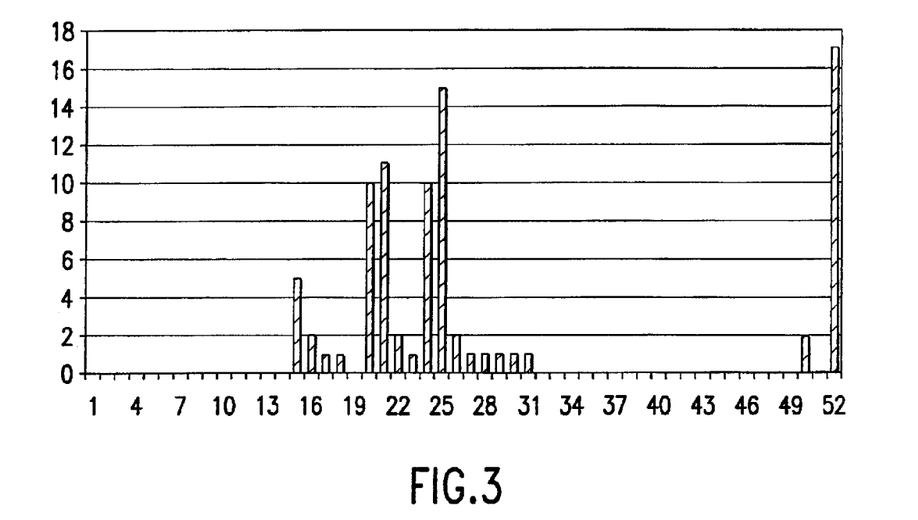
FIG. 3 is a timing histogram of a symbol at a reading distance of eight and a half inches.

It follows from the blur model that under high blur conditions the elements within a sequence of at least two narrow elements should have a "small" luminance contrast difference between adjacant bar and space and the "small" timing distance (in time domain) between them as well. The contrast difference between elements, rather then the edge strength is used in that stage in order to improve the performance. The contrast difference is approximated from the Multi-bit data. The threshold values that define the range of "small contrast" and "small timing" are evaluated from the global histograms of contrast and distance. FIG. 2 illustrates the histogram of the distance between edges of Code 39 Symbol "123ABC" scanned at 6". FIG. 3 shows similar histogram of the same bar code scanned at 8.5". From the histogram plot, one can easily see that a narrow element width is around 20 in the first case and around 15 in the second case.

Figure 4:
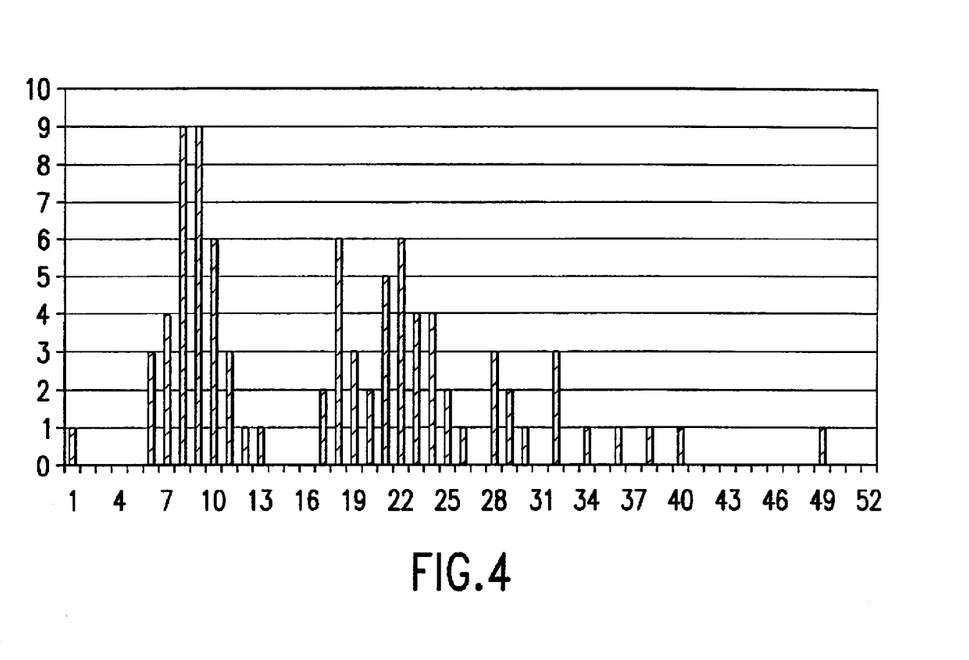
FIG. 4 is a contrast histogram of a symbol at reading distance of six inches.
Figure 5:
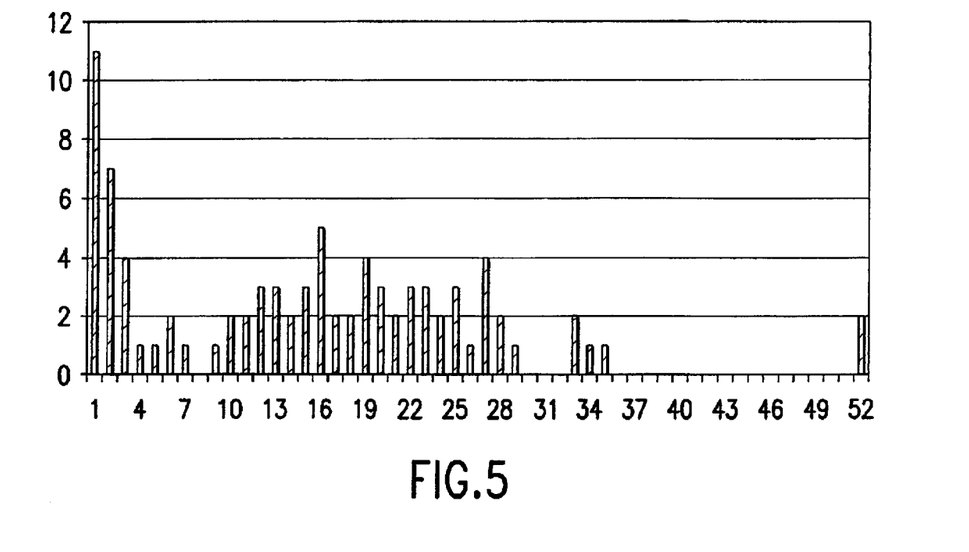
FIG. 5 is a contrast histogram of a symol at the reading distance of eight and a half inches.

Similar method is used to evaluate the "small contrast" thresholds. FIG. 4 shows the absolute value of the contrast between two elements for the Code 39 bar code at distance of 6", while FIG. 5 shows similar histogram of the signal at distance of 8.5". From the histogram plot, one can easily evaluate that a contrast difference between narrow element is about 7 in the first case, and is close to 0 in the second case.

7. Estimation of Narrow Element N and Edge Error D

In the previous stage the sequences of at least two narrow elements in the row were identified. According to the blur model the width of the first and the width of the last element of the sequence equals approximately to the width of the narrow element plus the edge error caused by blur (N+D)— see FIG. 2*a*, 2*b*, element $T_2$. Similarly, the width of the last element of the sequence is N+D. The width of remaining elements of the sequence is N. If there are k such sequences identified in a given scan, which contain altogether n elements indexed $v_1, \ldots v_n$ then the value of N and D can be evaluated by the least-square estimate, as given in [H. W. Sorenson, Parameter Estimation: Principles and Problems, Marcel Dekker, 1980]:

$$\binom{N}{d} = (H^T H)^{-1} H^T V$$

where:

$$V = \begin{pmatrix} v_1 \\ v_2 \\ v_3 \\ \ldots \\ v_n \end{pmatrix}$$

is the observation vector composed of widths of elements, which belong to sequences combined together (for instance values t2, t3, t4 are observations in case of sequence of three consecutive narrow elements in FIG. 2b). H is defined in such a way that each observation is described by a row of the matrix. A row equals to (1,1) if the element width is N+d, or to (1,0) if the element widths is N. For instance, in a case of a sequence (t2, t3, t4) from FIG. 2b, the matrix H is:

$$H = \begin{pmatrix} 1 & 1 \\ 1 & 0 \\ 1 & 1 \end{pmatrix}$$

8. Further Element Classification

The further element classification is carried on using already acquired knowledge about sequences of consecutive narrow element and the narrow element size N.

One should note that sequences of consecutive narrow element must be adjacent to wide elements. Also, the wide elements adjacent to wide elements can be identified easily according to their width, since their width must be at least 2N–D. The remaining elements, not classified so far, must belong to sequences of interleaving narrow and wide elements, i.e. narrow-wide-narrow-wide or wide-narrow-wide-narrow and so on. The classification of those elements is based on the signal contrast level. Signal contrast levels can be obtained by discrete integration of the derivative signal or approximated form Multibit data.

Figure 6:
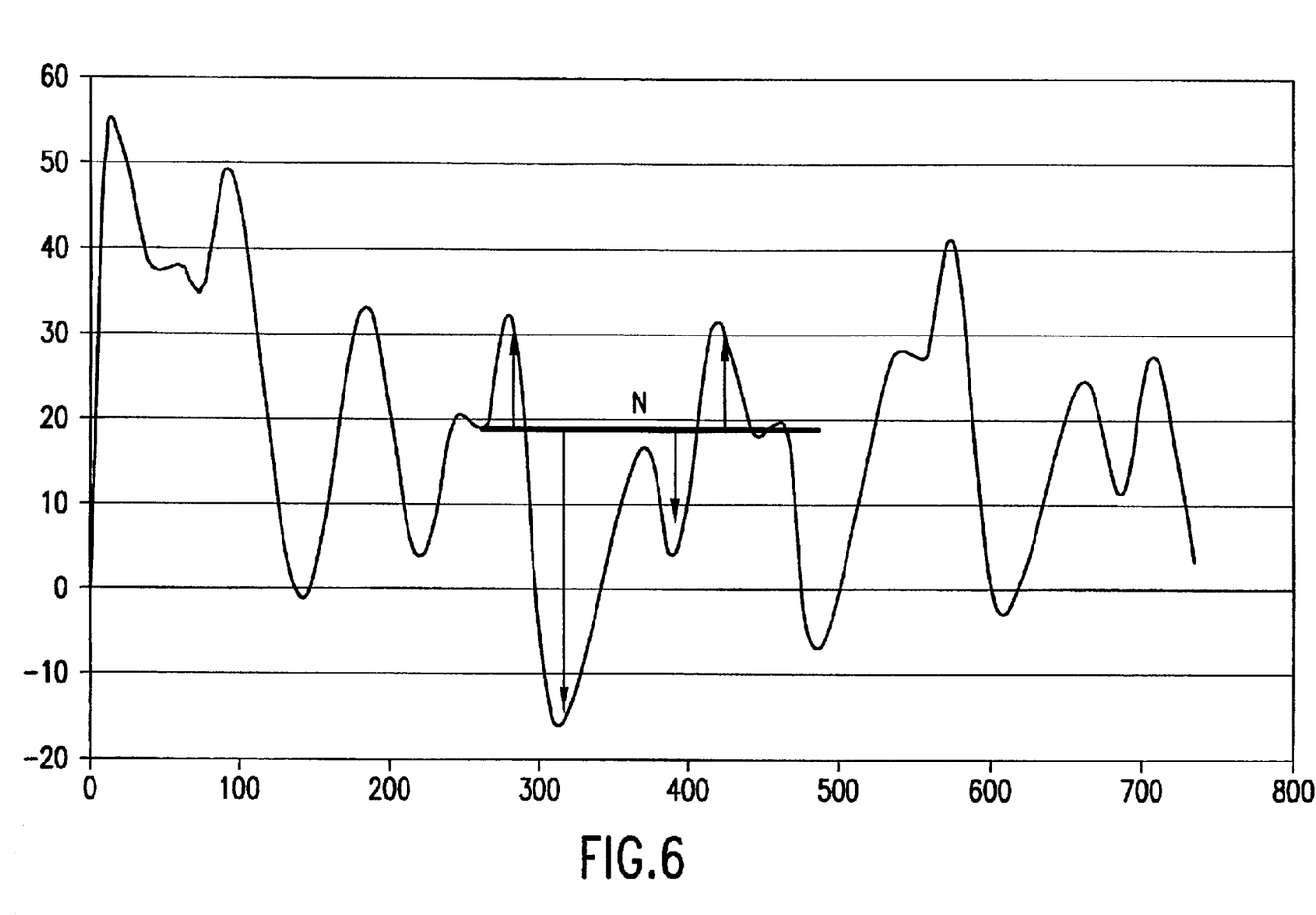
FIG. 6 illustrates element classification according to contrast level

The class of the element is evaluated according to the difference of the element luminance measured from the reference level. The reference level is represented by the straight line, which joins neighboring sequences of consecutive narrow element, as illustrated on FIG. 6. The reference line is needed in order to compensate for AC coupling of the derivative signal, which results in a low frequency signal drift. Then we measure the distance of peak/valley from the line. If element is a peak, it represents Narrow is a distance if negative or small positive value. If element is a valley it represents a Narrow is distance is positive or small negative number. Fixed thresholds, found experimentally are used. When decision is not obvious we revert to classification based on edge features.

Figure 7:
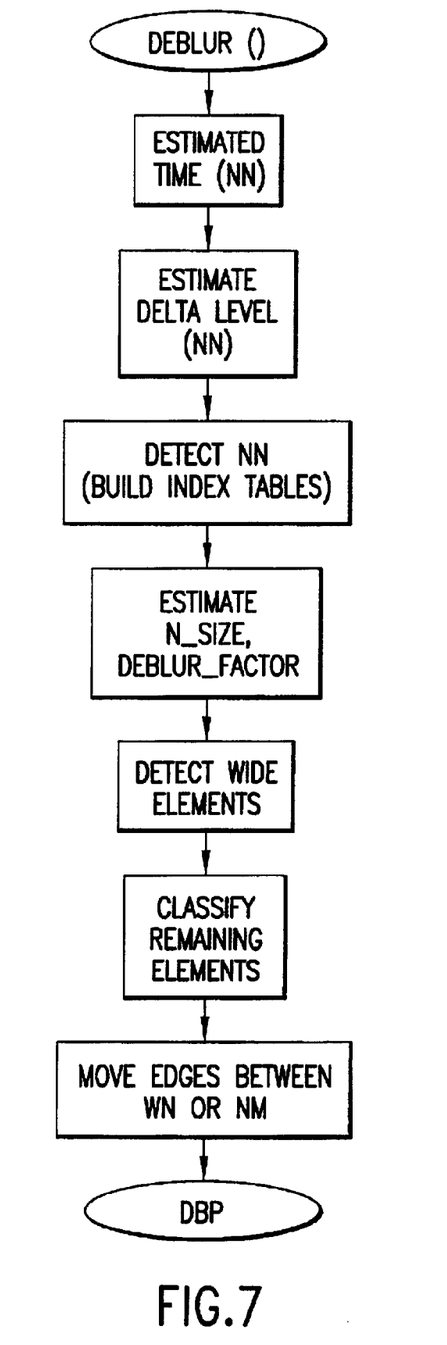
FIG. 7 is a flow chart of the debluring algorithm according to the invention.

The flow chart for the deblurring algorithm is set forth in FIG. 7.

Figure 8:
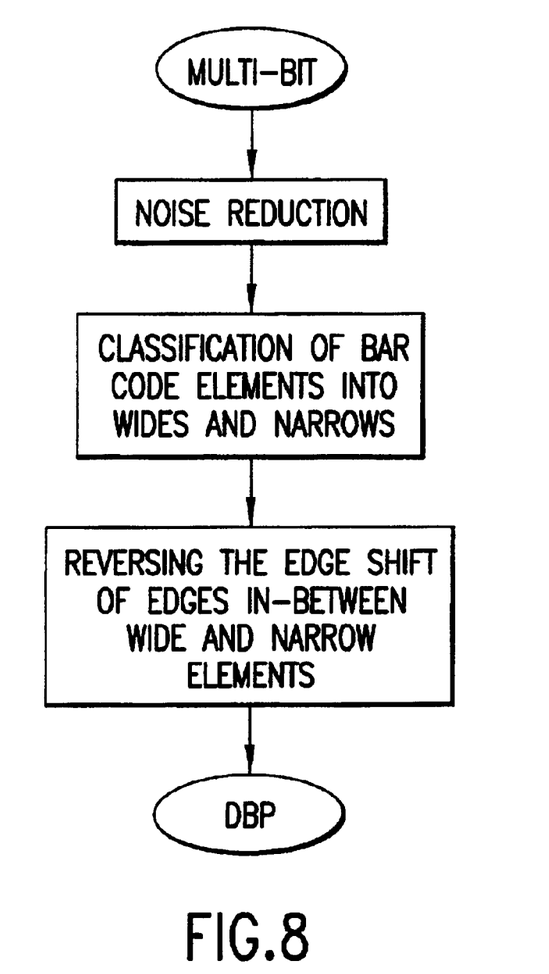
FIG. 8 is a flow chart of the steps from the multibit signal to the digitized DPB signal.

FIG. 8 summarizes the steps of the present invention from the multibit signal through the process for obtaining the digitized DBP signal.

9. Implementation in Hardware

As a preferred embodiment, we describe the implementation of the present invention in a laser-scanning, bar code reading module similar to the module disclosed in U.S. Pat. No. 5,367,151, issued to Dvorkis et al. assigned to Symbol Technologies, Inc. and hereby incorporated by reference, and also similar to the configuration of a bar code reader commercially available as part number SE 1000 or SE 1200 from Symbol Technologies, Inc. of Holtsville, N.Y. Alternatively, or in addition, features of U.S. Pat. Nos. 4,387,297, and 4,760,248 issued to Swartz et al., or U.S. Pat. No. 4,409,470 issued to Shepard et al., both such patents assigned to Symbol Technologies, Inc., may be employed in constructing the bar code reader unit. These U.S. Pat. Nos. 4,760,248, 4,387,297 and 4,409,470 are incorporated herein by reference.

Although the invention has been discussed with reference to certain decoder algorithms and other features of the disclosed embodiment it will be understood that a variety of processing mechanisms and reader configurations could be used. Other conventional features of bar code reading systems can also be combined with the present invention if so desired. The invention is preferably implemented using software and miniaturized storage and processor components such as those described herein or otherwise known in the art. The reader of the present invention is also not limited to use in portable devices and can also be easily adapted for use in a stationary housing either of the "table top" or "projection" variety, or so called conveyer belt or tunnel scanning systems, wherein the item on which the symbol resides is moved across the scanner head.

Additionally, even though the present invention has been described with respect to reading one dimensional bar codes, it is not limited to such embodiments, but may also be applicable to more complex indicia scanning or data acquisition applications such as two dimensional bar codes and matrix array symbols comprised of geometric shapes. It is conceivable that the present invention may also find application for use with various machine vision or optical character recognition applications in which information is derived from indicia such as printed characters or symbols, or from the surface or configurational characteristics of the article being scanned.

In addition to being packaged in specific housings, the elements of the scanner may be implemented in a very compact assembly or OEM subassembly such as a single integral module or "scan engine". Such a module can interchangeably be used as the dedicated scanning element for a variety of different operating modalities and types of data acquisition systems. For example, the module may be alternatively used in a hand-held manner, in a table top goose neck scanner attached to a flexible arm or mounting extending over the surface of the table or attached to the underside of the table top, or as a subcomponent or subassembly of a more sophisticated data acquisition system such as a tunnel scanner system.

Each of these different implementations is associated with a different modality of reading bar code or other symbols. Thus, for example, the hand-held scanner is typically operated by the user aiming the scanner at the target; the table top scanner operated while the target is moved rapidly through the scan field, or presented to a scan pattern which is imaged on a background surface. Still other modalities within the scope of the present invention envision the articles being moved past a plurality of scan modules oriented in different directions so the field of view allows at least one scan of a symbol which may be arbitrarily positioned on the article.

The module could advantageously comprise various optic subassemblies mounted on a support, and photodetection components, such as a photodiode, charge coupled or solid state imaging device. Control or data lines associated with such components may be connected to an electrical connector mounted to enable the module to be electrically connected to a mating connector associated with other elements of the data acquisitions system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition unit including on or more such components as keyboard, display, printer, data storage, application software, and data bases. Such a unit may also include a communications interface to permit the data acquisition unit to communicate with a host computer, or other components of a data processing system, or with remote computers through a local or wide area network or with the telephone exchange network, either through a modem, xDSL, cable, or an ISDN interface, or by low power radio broadcast from a portable terminal to a stationary or mobile receiver and thereafter to other system components.

It will be understood that each of the features described above, or two or more together, may find a useful application in other types of scanners and readers differing from the types described above.

While the invention has been illustrated and described as embodied in it is not intended to be limited to the details shown, since various modifications and structural changes may be made without departing in any way from the spirit of the present invention.

Without further analysis, the foregoing will so fully reveal the gist of the present invention that others can readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

We claim:

1. A method of correcting for convolution distortion in a laser scanner for sweeping a bar code symbol having elements of wide and narrow widths separated by edges and arranged along a scan direction with an oversized laser beam spot having a spot width, as considered along the scan direction, which is at least two times greater than a minimum element width, the method comprising the steps of:

a) detecting light reflected by the oversized beam spot off the elements along the scan direction, and generating an analog signal indicative of the symbol being swept;

b) convoluting the analog signal with the oversized beam spot to generate a convoluted signal having peaks and valleys, each peak and valley between adjacent elements of different widths being offset by an edge shift from the edge between the adjacent elements of different widths;

c) estimating the edge shift to generate an estimated edge shift; and d) correcting each offset peak and valley by the estimated edge shift to align each offset peak and valley with the edge between the adjacent elements of different widths.

2. The method of claim 1, wherein the estimating step includes estimating a time and an amplitude for each peak and valley of the convoluted signal.

3. The method of claim 2, wherein the estimating step includes creating histograms of a time and an amplitude estimated for each peak and valley, and selecting minimum occurrences of times and minimum occurrences of amplitudes as corresponding to an edge between adjacent elements of narrow widths.

4. The method of claim 3, wherein the minimum occurrences of times and the minimum occurrences of amplitudes are used to identify sequences of adjacent elements of narrow widths.

5. The method of claim 4, wherein the elements adjacent to identified sequences of adjacent elements of narrow widths are identified as elements of wide widths.

6. The method of claim 5, wherein the width of elements of narrow width and the estimated edge shift are estimated from the width of elements of the identified sequences of the adjacent elements of narrow widths.

7. The method of claim 3, wherein the estimating step includes selecting times that are twice as long as the time of an element of narrow width as identifying an elemet of wide width.

8. The method of claim 7, wherein remaining elements are identified as interleaving elements of narrow and wide widths.

9. The method of claim 7, wherein the estimating step includes distingishing between the elements of wide and narrow widths.

10. The method of claim 1, wherein the correcting step is performed by adding a correction factor equal to the estimated edge shift to a time coordinate of an edge located between an element of wide width followed by an element of narrow width, and by subtracting the correction factor from an edge located between an element of narrow width followed by an element of wide width.

* * * * *